Nov. 4, 1969

P. K. ERDMANN 3,477,035

CIRCUIT ARRANGEMENT TO INTEGRATE VOLTAGES OR CURRENTS

Filed Nov. 28, 1967

Inventor:
Piers Kaspar Erdmann
BY Spencer & Kaye
Attorneys

Inventor:
Piers Kaspar Erdmann
BY Spencer & Kaye
Attorneys

United States Patent Office 3,477,035
Patented Nov. 4, 1969

3,477,035
CIRCUIT ARRANGEMENT TO INTEGRATE VOLTAGES OR CURRENTS
Piers Kaspar Erdmann, Essen, Germany, assignor to Beteiligungs- und Patentverwaltungs G.m.b.H., Essen, Germany
Filed Nov. 28, 1967, Ser. No. 686,222
Claims priority, application Germany, Dec. 3, 1966, B 90,133
Int. Cl. H03f 1/36, 3/68
U.S. Cl. 330—104    3 Claims

ABSTRACT OF THE DISCLOSURE

A circuit including a high-gain amplifier having capacitively coupled feedback, the amplifier including two outputs of opposite polarity one of which is fed back capacitively and the other of which is fed back resistively in order to compensate for leakage from the capacitor.

BACKGROUND OF THE INVENTION

Known circuit arrangements use amplifiers with a very large amplification G to integrate voltages or currents with respect to time, the input and output of these amplifiers being connected to a capacitor C. Through a resistor $R_O$, the voltage to be measured is converted into a current which is as proportional thereto as possible and which is then fed to the input of the amplifier. The capacitor C is charged by the current according to the equation $$V_C = \frac{1}{c}\int_{t_0}^{t_1} I\,dt \tag{1}$$

These circuit arrangements have the drawback that the amplification G of the amplifiers must be very large so that the input voltage $V_E$ at the amplifier input E remains very low in relation to the measured voltage $V_Q$ even at high output voltages $V_E \cdot G$. Only under these conditions does the current $I_{RO}$ through the resistor $R_O$, which resistor is disposed between the measuring voltage source $V_Q$ and the amplifier input E, remain proportional to the measuring voltage $V_Q$. According to the equation $$\frac{V_Q - V_E}{R_O} = I_{R_Q} \tag{2}$$

$V_Q$ is proportional to $I_R$ only when $V_E$ is negligibly low. There is the further disadvantage that the energy of the capacitor will partially dissipate due to the leakage resistance and the input resistance of the amplifier, particularly when measurements are taken over long periods of time.

SUMMARY OF THE INVENTION

It is therefore a main object of the present invention to eliminate the above-described drawbacks of the known circuit arrangements.

Another object of the present invention is to provide such circuits which compensate for otherwise disturbing currents created therein.

These objects and others ancillary thereto are accomplished in accordance with preferred embodiments of the present invention wherein a circuit arrangement is provided for integrating voltages or currents, preferably during long periods of time, in which the input and the output of a D.C. amplifier are connected via a capacitor. In the present invention a D.C. amplifier is provided with a second output of opposite polarity with respect to the first output. This second output is connected to the input via a resistance which is so dimensioned that its current, which is coupled back to the input, is of the same amplitude as the current flowing in the opposite direction coming from the capacitor, and this current includes the leakage current caused by the leakage resistance of the capacitor and of the discharge current at the input of the D.C. amplifier, measured at an input signal of 0 volt.

DESCRIPTION OF THE PREFERRED EMBODIMENTS

Figure 1:
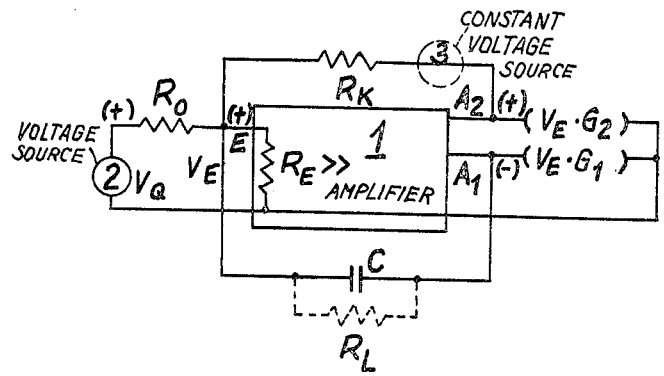
FIGURE 1 is a circuit diagram of a simplified circuit according to the present invention.

As can be seen in FIGURE 1, the input of a D.C. amplifier 1 having oppositely poled amplifier outputs $A_1$ and $A_2$ is connected to the voltage source 2 having the voltage $V_Q$ via the resistor $R_O$. Between the output terminal $A_1$ and the oppositely poled input terminal E, there is the capacitor C with its leakage resistance $R_L$ whose effect corresponds to a resistor connected in parallel to the capacitor C. The output terminal $A_2$, which has the same polarity as the input terminal E, is connected therewith via the compensation resistance $R_K$. The output voltages appear at the output terminals $A_1$ and $A_2$ as the products of the input voltage $V_E$ and the voltage amplifications $G_1$ and $G_2$. The circuit operates faultlessly at low amplification only when the resulting current $I_C$ which charges the capacitor C is dependent exclusively on the source voltage $V_Q$ and on the size of the resistor $R_O$, but definitely not on the input voltage $V_E$.

The resulting current $I_C$ is formed of the two currents which charge the capacitor C, i.e., of $I_R$, which comes from the measuring voltage source 2 via the resistor $R_O$, of $I_{RK}$, which comes from the output $A_2$ via the compensating resistor $R_K$, and of the two currents which discharge the capacitor C, namely, $I_{RE}$, which flows off via the input resistor $R_E$, and $I_{RL}$, which is the leakage current caused in the leakage resistance $R_L$ of the capacitor C.

The appropriate equations are as follows:

$$I_C = I_{R_O} + I_{R_K} - (I_{R_E} + I_{R_L}) \tag{3}$$

$I_{RE}$ and $I_{RL}$ are combined to form $I_{RG}$ $$I_{R_G} = I_{R_E} + I_{R_L} = \frac{V_E}{R_E} + \frac{V_E \cdot G_1 + V_E}{R_L} = \frac{V_E}{R_E} + \frac{\dfrac{V_E}{R_L}}{G_1 + 1} \tag{4}$$

$$\frac{I_{R_G}}{V_E} = \frac{1}{R_E} + \frac{\dfrac{1}{R_L}}{G_1 + 1};\quad \frac{V_E}{I_{R_G}} = R_G = R_E \bigg\| \frac{R_L}{G_1 + 1} \tag{5}$$

$$I_C = I_{R_O} + I_{R_K} - I_{R_G} = \frac{V_Q - V_E}{R_O} + \frac{V_E \cdot G_2 + V_E}{R_K} - \frac{V_E}{R_G} \tag{6}$$

wherein the value of the resistor $R_K$ is determined by the values $R_G$, $R_O$ and $G_2$ according to the equations $$R_K = (R_G \| R_O)G_2 - (R_G \| R_O) = (R_G \| R_O)(G_2 - 1) \quad (7)$$

$$I_C = \frac{V_Q - V_E}{R_O} + \frac{V_E(G_2 - 1)}{(R_G \| R_O)(G_2 - 1)} - \frac{V_E}{R_G} \quad (8)$$

$$I_C = \frac{V_Q - V_E}{R_O} + \frac{V_E(R_G + R_O)}{R_G \cdot R_O} - \frac{V_E}{R_G} \quad (9)$$

$$I_C = \frac{V_Q \cdot R_G - V_E R_G + V_E R_G + V_E R_O - V_E R_O}{R_G \cdot R_O} = \frac{V_Q}{R_O} \quad (10)$$

The result from these equations is that $I_C$ depends exclusively on $V_Q$ and on $R_O$ and that furthermore the leakage current as well as the discharge current are completely compensated by the current through the resistor $R_K$. When $V_Q$ equals zero, $I_C$ also equals zero. This means that the amplifier input can be short-circuited via $R_O$ without resulting in a discharge of capacitor C. Thus, a voltage integral can be preserved with great accuracy for a long period of time in the form of an output voltage $V_A$ as an analogue value. It is further possible to compensate for a constant leakage current coming from the input terminal E of the amplifier 1 with a constant voltage source 3 connected in series with the resistor $R_K$.

Figure 2:
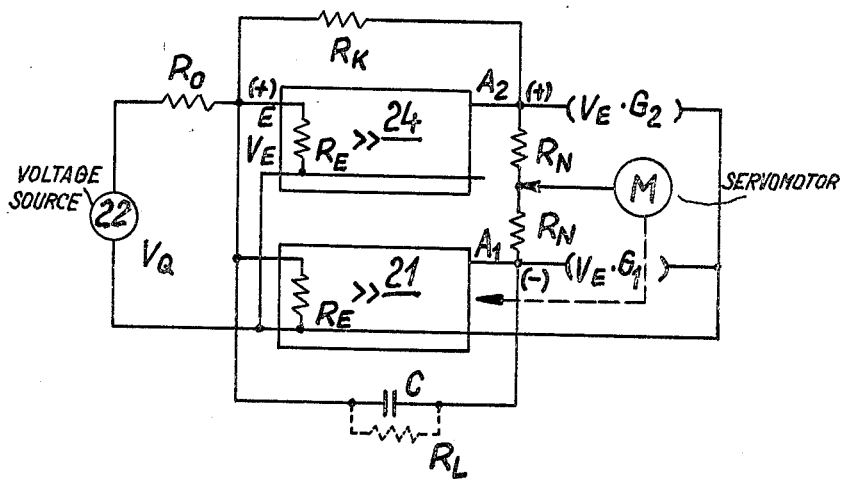
FIGURE 2 is a circuit diagram of an arrangement using two amplifiers instead of the single amplifier used in the embodiment of FIGURE 1.

As can be seen in FIGURE 2, it can be advantageous to use, instead of one amplifier with two outputs, two amplifiers 21 and 24 each having one output and whose inputs are connected in parallel. The outputs are herein of opposite polarities and are connected in the same manner as the outputs of amplifier 1 according to FIGURE 1 which has two outputs. The outputs $A_1$ and $A_2$ are connected via a voltage divider of the resistance $R_N$ whose center tap receives a voltage with reference to the amplifier common reference connection when only one of the amplifiers shows a zero drift. For integration processes, particularly with rapidly fluctuating measuring voltages, an amplifier with a very high transmission frequency ($f_0 > 100K$ c.p.s.) is preferred which, however, results in a correspondingly lesser zero point constancy $$(\Delta V_E > 10 \text{ mv./h.})$$

than would be achieved in an amplifier with a lower upper transmission frequency ($f_0 < 1000$ c.p.s.) which, however, is well suited to generate the compensation current $I_{R_K}$. The voltage between the tap and the amplifier common reference connection, in the circuit according to FIGURE 2, is amplified and fed to the servomotor M which corrects the zero point of the amplifier 21 mechanically, e.g., via a potentiometer.

Figure 3:
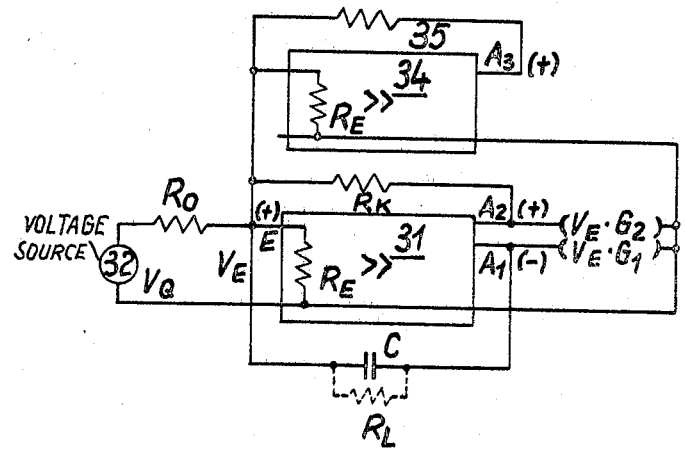
FIGURE 3 is a circuit diagram of an arrangement using a second and chopper amplifier.

The zero error can also be corrected by connecting, parallel to the input of the amplifier 31 according to FIGURE 3, the input of a driftfree chopper amplifier 34 (e.g. published in "International Dictionary of Physics and Electronics," see: chopper, amplifier chopper) whose indentically polled output $A_3$ is also connected to the input via a resistor 35 which is advantageously dimensioned so that the current coming from the output compensates for the loss current at the input of the amplifiers whereas the resistance $R_K$ according to FIGURE 1 is such that the current coming from the output only compensates for the leakage within the capacitor C. Since a chopper amplifier possesses a sufficient zero constancy ($\Delta V_E < 5\mu$ v./h.), the input and output voltages also remain sufficiently proportional to compensate for the loss current at the input of the amplifier at any available voltage with an equally strong oppositely poled current coming from the output of the chopper amplifier.

Figure 4:
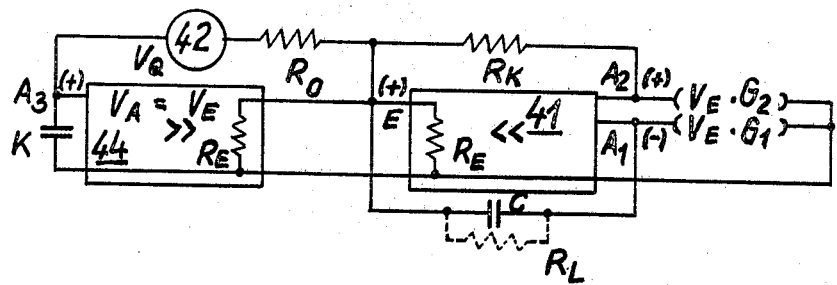
FIGURE 4 is a circuit diagram of a further arrangement similar to FIGURE 3 but wherein the chopper amplifier is connected in parallel with the other amplifier.

If the input resistance $R_E$ of the amplifier 31 according to FIGURE 3 is particularly high ohmically ($R_E > 10^{12} \Omega$), it is advantageous to use a circuit as shown in FIGURE 4. Here the driftfree amplifier 44 which also has a particularly high input resistance ($R_E > 10^{12} \Omega$) and a voltage amplification of 1:1 is connected parallel to the input of the amplifier 41. The voltage source 42 with the measuring voltage $V_Q$ in this arrangement is disposed before the resistor $R_O$ and between the input terminal E of the amplifier 41 and the output terminal $A_3$ of the amplifier 44. Since the potential between these two terminals is always the same, due to the voltage amplification of 1:1, the entire voltage $V_Q$ is always applied to resistor $R_O$ to that $V_Q$ is always strictly proportional to the current $I_{R_O}$ at the resistor $R_O$ which is the prerequisite for faultfree integration. Moreover, due to the equality of voltages at the terminals E and $A_3$, the load of the capacitor C is not discharged via the resistor $R_O$ so that the resistance $R_K$ is dimensioned such that the current coming from output $A_2$ only compensates the loss current of capacitor C. To make this circuit insensitive to interference, a capacitor K is connected between the output terminal $A_3$ and the common reference connection of the amplifier 44, to short-circuit high-frequency interference voltages at the output terminal $A_3$.

The circuit according to the present invention is not limited to the embodiments here described; it is also possible, for example, to measure the output voltage $V_E \cdot G_1$ with particular accuracy between the output terminals $A_1$ and $A_3$ of the amplifiers 1 and 24 (or 34 or 44).

Values of typical circuit components:

Amplifiers:
$R_E$ ------------------------------------ 1MΩ
G ------------------------------------ 100

Resistances:
$R_O$ ------------------------------------ 1MΩ
$R_K$ ------------------------------------ 33MΩ
$R_L$ ------------------------------------ 100MΩ

Capacitor C ------------------------------------ 10 μf

It will be understood that the above description of the present invention is susceptible to various modifications, changes, and adaptations.

What is claimed is:

1. In a circuit device for integrating voltages or currents especially over long periods of time, the improvement comprising, in combination:
   (a) first D.C. amplifier means having an input and two outputs having opposite polarity;
   (b) capacitor means connected between one of said outputs and said input;
   (c) resistance means connected between the other of said outputs and said input for providing a compensating current at said input which compensates for the leakage current from the capacitor means which flows in the opposite direction from the compensating current; and
   (d) second amplifier means having an input and an output and connected in parallel to the input of said first amplifier means and having good zero point constancy and a voltage amplification of 1:1, the input of said device being disposed between the input and output of said second amplifier means.

2. A device as defined in claim 1 comprising second capacitor means connected between the output of the second amplifier means and the amplifier common reference connection.

3. In a circuit device for integrating voltages or currents especially over long periods of time, the improvement comprising, in combination:
   (a) D.C. amplifier means having an input and two outputs having opposite polarity;
   (b) capacitor means connected between one of said outputs and said input;
   (c) resistance means connected between the other of said outputs and said input for providing a compensating current at said input which compensates for the leakage current from the capacitor means which flows in the opposite direction from the compensating current and the discharge current at the input when measured at an input of zero volts;

(d) driftfree chopper amplifier means having an input connected in parallel to the input of the D.C. amplifier means; and (e) a further resistance means, the output of said chopper amplifier means which is of the same polarity as the input, being connected to the input via said further resistance means which is arranged so that the current flowing from the output compensates for the loss current at the input of the amplifier means.

References Cited

UNITED STATES PATENTS

| | | | |
|---|---|---|---|
| 2,717,310 | 9/1955 | Woodruff | 328—127 |
| 3,381,230 | 4/1968 | Gilbert et al. | 328—127 |

FOREIGN PATENTS 131,799   Australia.

OTHER REFERENCES

Handbook of Operational Amplifier Applications, Burr-Brown Research Corp., 1st edition, 1963, pp. 2,3.

ROY LAKE, Primary Examiner

JAMES B. MULLINS, Assistant Examiner

U.S. Cl. X.R.

328—127; 330—9